US007541858B2

(12) United States Patent
Yukutake et al.

(10) Patent No.: US 7,541,858 B2
(45) Date of Patent: Jun. 2, 2009

(54) INTEGRATION CIRCUIT, DECREMENT CIRCUIT, AND SEMICONDUCTOR DEVICES

(75) Inventors: Seigou Yukutake, Hitachinaka (JP); Mutsuhiro Mori, Mito (JP); Yasuhiko Kohno, Naka (JP)

(73) Assignee: Renesas Technology Corp., Tokyo (JP)

( * ) Notice: Subject to any disclaimer, the term of this patent is extended or adjusted under 35 U.S.C. 154(b) by 99 days.

(21) Appl. No.: 11/187,862

(22) Filed: Jul. 25, 2005

(65) Prior Publication Data

US 2006/0022609 A1 Feb. 2, 2006

(30) Foreign Application Priority Data

Jul. 27, 2004 (JP) ............................ 2004-218031

(51) Int. Cl.
*G06G 7/18* (2006.01)
*G06F 7/64* (2006.01)

(52) U.S. Cl. .................................. 327/336; 315/209 T

(58) Field of Classification Search ................. 123/630, 123/644, 650, 651, 652; 315/209; 327/336
See application file for complete search history.

(56) References Cited

U.S. PATENT DOCUMENTS 3,901,205 A * 8/1975 Brungsberg ................. 123/644
4,417,217 A * 11/1983 Sugiyama .................... 331/66
4,704,639 A * 11/1987 Yamanishi et al. ............ 386/26
5,571,245 A * 11/1996 Ooyabu et al. .............. 123/644
6,336,448 B1 * 1/2002 Furuhata et al. ............. 123/644
6,684,867 B2 2/2004 Ito et al.
2001/0037801 A1 * 11/2001 Ito et al. ..................... 123/644
2004/0145749 A1 * 7/2004 Shigeki et al. .............. 356/494

FOREIGN PATENT DOCUMENTS

JP 2001-248529 9/2001

* cited by examiner

*Primary Examiner*—Erick Solis
(74) *Attorney, Agent, or Firm*—Dickstein Shapiro LLP

(57) ABSTRACT

An ignitor comprising a circuit with a millisecond order time constant and with a minimum circuit size and area, which is capable of self-shutdown without leading to erroneous ignition upon detection of an abnormality. An ignitor 1 capable of self-shutdown upon detection of an abnormality comprises an abnormality detection circuit 12 whose rise output is applied to the gate of a self-shutdown MOSFET 33 via an integration circuit 33 comprised of a diode 8 and a capacitor 9. The gate voltage of IGBT 5*a*, which is a main-current switching device, can be decremented.

9 Claims, 9 Drawing Sheets

INTEGRATION CIRCUIT, DECREMENT CIRCUIT, AND SEMICONDUCTOR DEVICES

BACKGROUND OF THE INVENTION

1. Field of the Invention

The present invention relates to a circuit technology for semiconductor devices. Particularly, it relates to a technology that can be effectively applied to a semiconductor device with components that can be fabricated on a semiconductor substrate chip, including an integration circuit with a time constant on the millisecond order, a decrement circuit, and a semiconductor device with a soft shutting-down function. The invention also relates to an ignition device (to be hereafter referred to as "an ignitor") for automotive engines to which the semiconductor device is applied.

2. Background Art

The following is an analysis of ignitors for automotive engines conducted by the inventors.

As ignitors for automotive engines, distributorless ignition systems are increasingly replacing the conventional distributor-employing systems for the purpose of saving energy. In the distributorless ignition systems, each cylinder of the internal combustion engine is provided with an ignitor and an ignition coil. The ignitor conducts switching control of the current on the primary side of the ignition coil such that a high voltage of several tens of thousands of volts is generated on the secondary side of the ignition coil. The high voltage causes an ignition plug to produce discharge while combustion is controlled within the cylinder. The switching device for the ignitor is increasingly comprised of an insulated gate semiconductor device, instead of the conventional bipolar transistors.

Such an ignitor is a power device for switching the current through the ignition coil in response to an ignition-control signal from an engine control unit (to be hereafter referred to as "an ECU"). In a normal operation, the control signal from the ECU is a pulse signal on the order of several milliseconds. However, the pulse width of the control signal from the ECU might be rendered into a continuously applied signal due to one cause or another. The current on the primary side of the ignition coil increases in accordance with a slope that is determined by the inductance L and the applied voltage V (di/dt=V/L). Therefore, the continuously applied signal would cause a current to flow continuously on the primary side of the ignition coil that would exceed an acceptable value, thereby damaging or burning out the ignition coil and the switching device. Ignitor devices have been developed that are fitted with a current-limiting function for preventing excess over a predetermined current limitation value. However, even if the value of the continuous current is controlled by the current-limiting function, the current would produce an amount of heat corresponding to the power as the product of voltage and current. The heat could lead to a thermal runaway or burning out of the ignitor. To prevent this problem, devices have also been developed that have a function for automatically shutting themselves down if their temperature exceeds a predetermined set value.

For example, Patent Document 1 discloses that current is forcibly terminated upon the detection of abnormal heating. The disclosed device comprises a pulse generating circuit, a counter circuit, and a step-waveform generating circuit, which are controlled in the following manner for preventing an erroneous ignition of the ignition plug upon forcible shutdown. The pulse generating circuit acts as an oscillator, while the counter circuit acts as a timer for causing a signal to be produced at desired periods based on a signal fed from the counter circuit in the previous stage. When overheating is detected, the output voltage of the step waveform generating circuit is controlled to produce a step voltage at the aforementioned periods. The step waveform is used to control a compulsory shutdown circuit such that the main current of the switching device is shut down in a stepwise manner. The step periods and the amount of current by which the main current is reduced per period are determined such that the voltage generated on the secondary side of the ignition coil does not exceed the value at which the ignition plug starts to produce spark discharge. In this publication, the periods are set to be on the order of 2 milliseconds so as to prevent erroneous ignition.

Patent Document 1: JP Patent Publication (Kokai) No. 2001-248529 A

SUMMARY OF THE INVENTION

An analysis of conventional ignitors for automotive engines has revealed the following.

In the technology disclosed in Patent Document 1, the number of circuit elements on the digital circuits, such as the counter circuit, is very large. Although this would not affect the area of circuitry in a microfabrication process, the circuit area would be very large when the process rule is on the order of several microns. Further, in power semiconductor devices, such as the ignitor, the addition of processes needs to be reduced to a minimum even when a control circuit is to be added. Consequently, available devices are limited, and it is not easy to mount an easy-to-use digital CMOS circuit together with other circuits.

It is therefore an object of the invention to provide an ignitor in which the size and area of circuits with millisecond-order time constants are minimized and which can be automatically shut down upon detection of an abnormality without causing erroneous ignition.

This and other objects of the invention, and the novel features thereof, will be apparent from the following description of the invention when considered in connection with the accompanying drawings.

The following is an outline of the invention disclosed herein.

In one aspect, in order to realize a circuit with a millisecond order time constant, a reverse leak resistance of a diode is used as a resistor element in an RC integration circuit. In an ignitor, the integrating circuit utilizing the reverse leak resistance of the diode is provided in a gate voltage decrement circuit for controlling the self-shutdown upon detection of an abnormality. The gate voltage of a MOSFET for drawing the gate potential is gradually controlled with a time constant on the order of milliseconds.

Specifically, the invention provides an integration circuit in which a diode and a capacitor are connected in series between an input terminal and ground. One end of the diode is used as the input terminal, while the other end is connected to one end of the capacitor to function as an output terminal. The other end of the capacitor is connected to ground.

In another aspect, the invention provides a decrement circuit in which a resistor and a MOSFET are connected in series between a power supply terminal and ground. The point of connection of the resistor and the MOSFET is used as an output terminal. The output of the integration circuit is connected to the gate of the MOSFET.

In yet another aspect, the invention provides a semiconductor device comprising a switching device for controlling the turning on and off of the current that flows on the primary side of an ignition coil, a current control circuit for limiting the main current that flows in the switching device, an abnormality detection circuit for detecting abnormalities when the main current is flowing, and a current decrement control circuit for compulsorily decrementing the main current in response to the output of the abnormality detection circuit. The current decrement control circuit includes the aforementioned integration circuit or decrement circuit.

The following is an outline of the effects obtained by the invention.

In accordance with the invention, an integration circuit of millisecond order can be constructed of only a diode and a capacitor by utilizing the reverse leak resistance of the diode. Therefore, the size and area of circuitry can be decreased as compared with cases where digital circuits are used.

Further, when the invention is applied to an ignitor, an integration circuit of millisecond order can be realized on the same semiconductor chip as a switching device. As a result, an ignition system that does not lead to erroneous ignition upon self-shutdown can be realized.

DESCRIPTION OF THE PREFERRED EMBODIMENTS

Figure 1:
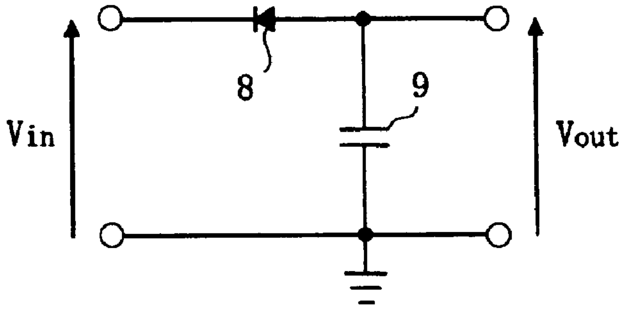
FIG. 1 shows a circuit diagram of an example of an integration circuit according to an embodiment of the invention.

Embodiments of the invention will be hereafter described in detail with reference to the attached drawings. Similar reference characters refer to similar elements in all figures of the drawings for the sake of simplicity.

Embodiment 1

FIG. 1 shows the circuit diagram of an example of an integration circuit according to an embodiment of the invention.

The integration circuit of the present embodiment comprises a diode 8 and a capacitor 9 that are connected in series between an input terminal (Vin) and ground. The cathode of the diode 8 functions as the input terminal. The anode of the diode 8 is connected to one end of the capacitor 9 to function as an output terminal (Vout). The other end of the capacitor 9 is connected to ground. Although conventional RC integration circuits consist of a resistor and a capacitor connected in series, the resistor element is characteristically replaced with a diode in accordance with the invention.

The reverse leak resistance of the diode 8 is on the order of several megaohms to several gigaohms, so that a high-value resistor can be fabricated on the semiconductor substrate within a small area. When the reverse leak resistance of the diode 8 is designed to be 100 MΩ and an ignition coil is constructed of such a diode and a capacitor 9 of 100 pF, the time constant ($\tau = C \times R$) would be 10 mS. In order to realize the resistance value of 100 MΩ using polycrystalline resistors each with a sheet resistance of 10 kΩ, ten thousand sheets would be required, which would surely result in an increase in layout area.

Figure 3:
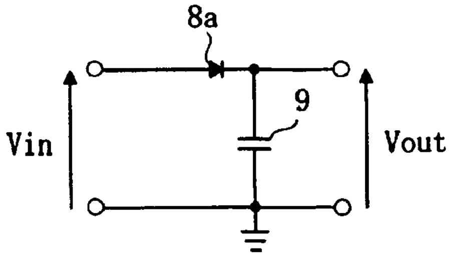
FIGS. 3(*a*) to 3(*e*) show circuit diagrams of examples of an integration circuit according to another embodiment of the invention.
Figure 3:
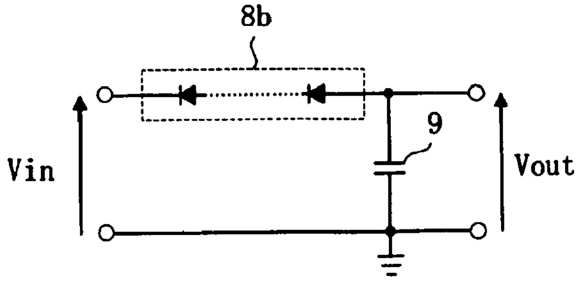
Figure 3:
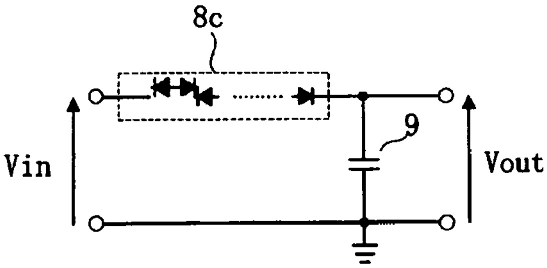
Figure 3:
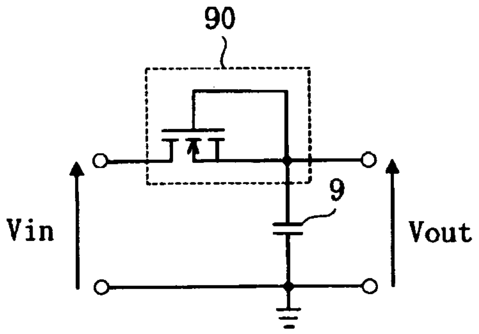
Figure 3:
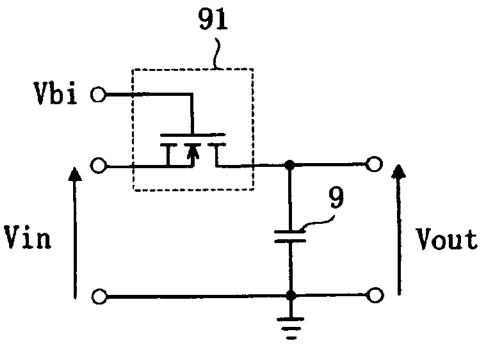

Further, the resistive component of the diode 8 has directionality, such that the integration circuit consisting of a series connection of diode 8 and capacitor 9 has different output time constants depending on the transition direction of input voltage. If the time constant for charging the capacitor 9 with electric charges during the rise transition of input signal is to be increased, the cathode of the diode 8 is connected to the input side and the anode is connected to the capacitor 9, as in the present embodiment. In this case, during the fall transition of the input signal, the capacitor 9 can be quickly discharged due to the forward directionality of the diode 8. On the other hand, if the time constant is to be increased during the fall transition of the input signal, the direction of the diode may be connected oppositely, as will be described later (FIG. 3).

Thus, in accordance with the present embodiment, an integration circuit with a millisecond-order time constant can be easily realized on a semiconductor substrate. Particularly, the use of the reverse leak resistance of the diode 8 permits the construction of an integration circuit with a time constant that is on an order greater than 1 millisecond, specifically, 10 milliseconds, using only diode 8 and capacitor 9. As a result, circuitry size and area can be reduced as compared with cases where digital circuits are used.

Embodiment 2

Figure 2:
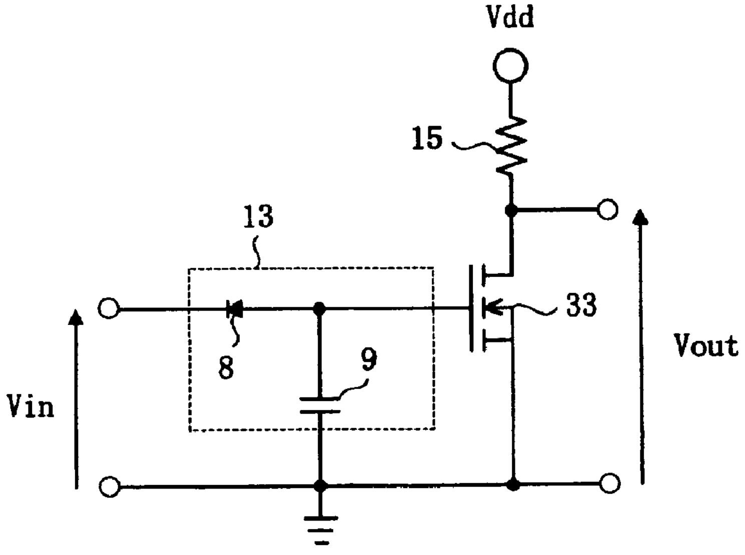
FIG. 2 shows a circuit diagram of an example of a decrement circuit according to an embodiment of the invention.

FIG. 2 shows the circuit diagram of a decrement circuit in accordance with a second embodiment of the invention.

The decrement circuit of the present embodiment comprises an integration circuit 13, a resistor 15, and a MOSFET 33. The resistor 15 and the MOSFET 33 are connected in series between a power supply terminal (Vdd) and ground. The point of connection of the resistor 15 and the MOSFET 33 is used as an output terminal (Vout), with the output of the integration circuit 13 being connected to the gate of the MOSFET 33. The integration circuit 13 is the same circuit as described with reference to Embodiment 1.

In this decrement circuit, the MOSFET 33, which is of N-type, has its drain connected to the resistor 15, with the point of connection being used as the output terminal. The gate of the MOSFET 33 is connected to the output of the integration circuit 13. In this decrement circuit, the gate voltage of the MOSFET 33 is incremented by the integration circuit 13 in response to the rise transition of an input signal. Vin. As a result, the impedance is also incremented, thereby decrementing the output voltage Vout.

Thus, in accordance with the present embodiment, in addition to the effect provided by the integration circuit 13 of Embodiment 1, a decrement circuit can be easily realized, whereby the area of the semiconductor device can be reduced.

Embodiment 3

FIG. 3 shows circuit diagrams of other examples of the integration circuit of the invention.

FIG. 3(*a*) shows an integration circuit for obtaining an increased time constant during the fall transition of the input signal. The example differs from the circuit shown in FIG. 1 in that the diode 8*a* is disposed in the opposite direction. Namely, the anode of the diode 8*a* is connected to the input side, and the cathode is connected to the capacitor 9. In this way, the capacitor 9 can be slowly discharged during the fall transition of the input signal.

FIG. 3(*b*) shows another example in which a plurality of diodes 8*b* are connected in series. In this way, the time constant of the integration circuit can be increased.

FIG. 3(*c*) shows another example in which a plurality of diodes 8*c* are connected in alternating directions to form the so-called back-to-back connection. In this connection, the anodes or cathodes of adjacent diodes 8*c* can be commonly utilized, so that the layout area can be reduced. Further, the time constant can be increased for both rise and fall periods.

FIG. 3(*d*) shows another example of the integration circuit in which a diode-connected MOSFET 90 is used as a resistor element. Use of the MOSFET 90 makes it possible to control leak resistance or threshold value with channel density or shape, which makes fine adjustment of the time constant possible. Alternatively, a bipolar transistor may be used for the MOSFET 90.

FIG. 3(*e*) shows another example of the integration circuit in which a MOSFET 91 is used as a resistor element. The gate potential of the MOSFET 91 is controlled by a bias voltage Vbi, which makes fine adjustment of the time constant possible.

Thus, the layout area of the integration circuit can be reduced by using a diode or a MOSFET as the resistor element in the integration circuit.

Embodiment 4

Figure 4:
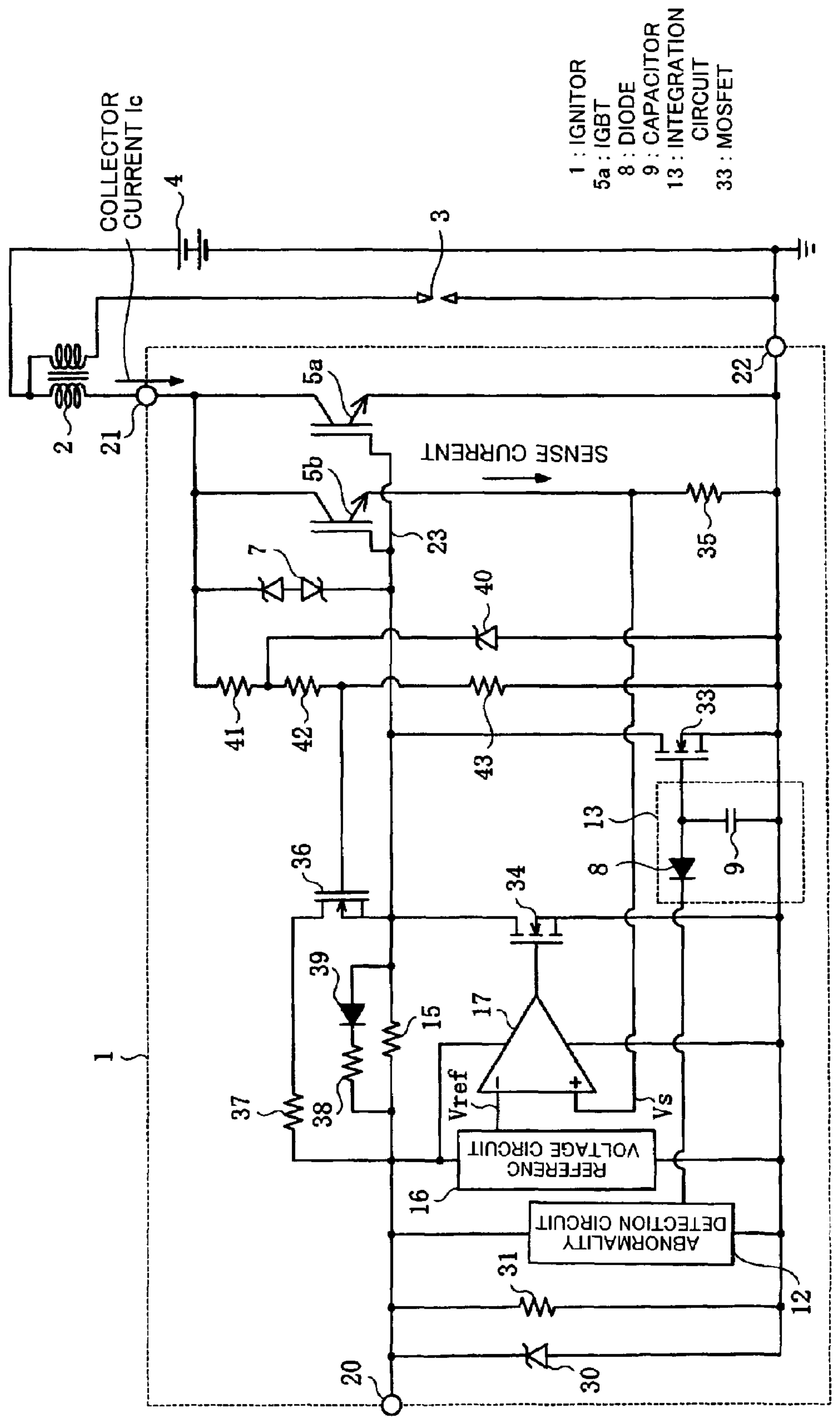
FIG. 4 shows a circuit diagram of an example of an ignitor according to an embodiment of the invention.

FIG. 4 shows the circuit diagram of an example of an ignitor in accordance with another embodiment of the invention.

An ignitor 1 of the present embodiment employs an insulated gate bipolar transistor (IGBT) 5*a,* which is an insulated gate power transistor, as a main-current switching device. The ignitor 1 receives a control signal from an ECU, which is not shown, via an input terminal 20. A main-current output terminal 21 of the ignitor 1 is connected to the collectors of IGBTs 5*a* and 5*b* (to be hereafter referred to as the collector of IGBT 5). It is also connected to the primary side of an ignition coil 2. The secondary side of the ignition coil is connected to an ignition plug 3. A common terminal of the primary and secondary sides of the ignition coil 2 is connected to a battery 4, which is the power supply. The negative terminal of the battery 4 and the other end of the ignition plug 3 are connected to a ground terminal 22 of the ignitor 1.

The gate of IGBT 5*a* for the main-current switching of the ignitor 1 is connected to the input terminal 20 via a resistor 15. IGBT 5*b* has its gate and collector commonly connected with those of IGBT 5*a,* with the emitter of IGBT 5*b* being connected to ground via a sense resistor 35. The noninverted input of an operational amplifier 17 is connected to the common connection point of IGBT 5*b* and the sense resistor 35. The inverted input of the operational amplifier 17 is connected to an output of a reference voltage circuit 16. The gate of a MOSFET 34 is connected to the output of the operational amplifier 17, and the drain is connected to the gates of IGBTs 5*a* and 5*b* (to be hereafter referred to as the gate of IGBT 5).

The output of an abnormality detection circuit 12 is connected to the cathode of the diode 8, whose anode is connected to ground via a capacitor 9, thereby forming an integration circuit 13. The gate of MOSFET 33 is connected to the output of the integration circuit 13, and the drain is connected to the gate of IGBT 5.

The source of a MOSFET 36 is connected to the gate of IGBT 5, and the drain is connected to the input terminal 20 via a resistor 37. The gate of MOSFET 36 is connected to the collector of IGBT 5 via a resistor 42 and a resistor 41. The gate is also connected to ground via a resistor 43. The cathode of a zener diode 40 is connected to the common connection point of the resistors 41 and 42, while the anode is connected to ground.

Between the collector and gate of IGBT 5, there is connected a zener diode 7. Another zener diode 30 has its cathode connected to the input terminal 20, with the anode connected to ground. A pull-down resistor 31 is disposed between the input terminal 20 and ground. The anode of a diode 39 is connected to the gate of IGBT 5, while the cathode is connected to the input terminal 20 via a resistor 38.

Thus, the ignitor 1 of the present embodiment is made up of: the switching device comprised of IGBT 5*a* for controlling the turning on and off of the current that flows on the primary side of the ignition coil 2; a current control circuit comprised of IGBT 5*b* for monitoring the main current that flows through the switching device, the reference voltage circuit 16 for limiting the main current in accordance with the result of monitoring, the operational amplifier 17, and MOSFET 33; the abnormality detection circuit 12 for detecting an abnormality when the main current is flowing; and the current decrement control circuit comprised of, e.g., an integration circuit 13 for forcibly decrementing the main current responsive to the output of the abnormality detection circuit 12 and a MOSFET 33.

Figure 5:
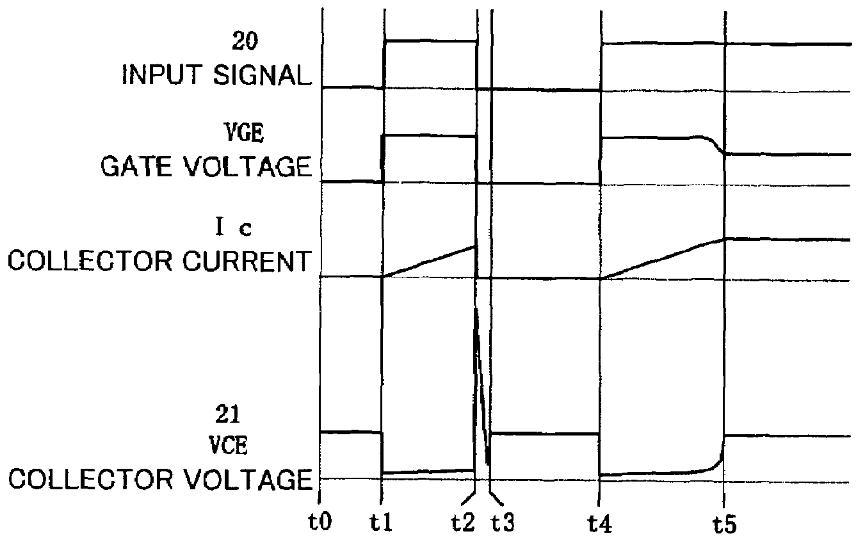
FIG. 5 shows a waveform chart illustrating the operation of the ignitor shown in FIG. 4.

FIG. 5 shows a waveform chart illustrating the operation of the ignitor 1, with reference to which the basic operation of the ignitor 1 of the present embodiment will be described.

In the period t0 to t1, the input terminal (control signal from the ECU 20) is at 0 V, and the IGBT 5 is off, meaning that there is no collector current Ic. Therefore, the collector voltage (VCE) is equal to the voltage of the battery 4.

At time t1, the input voltage is applied to the input terminal 20. When the gate voltage (VGE) of the IGBT 5 exceeds the threshold value of the IGBT 5, a collector current Ic starts to flow from the battery 4 to the IGBT 5 via the primary side of the ignition coil 2. Because the load is inductive, the collector current Ic monotonously increases with time.

At time t2, when the input terminal 20 is at 0 V, the collector current Ic decreases. The resultant negative current changing rate, or −dIc/dt, causes a voltage $V1=L\times(dIc/dt)$ to be generated at the primary side of the ignition coil 2. This voltage is then stepped up on the secondary side of the ignition coil 2 to several tens of thousands of volts, by which the ignition plug 3 is caused to discharge. After the ignition plug 3 has been discharged, a steady state is reached at time t3.

Hereafter the current limiting function is described. The period when the ignitor 1 is on is controlled by the ECU. Although the control signal normally has a pulse width on the order of 1 to 2 milliseconds, a very long signal of more than several milliseconds could be applied to the input terminal 20 in case the engine is unexpectedly put in an interrupted state for one reason or another. The collector current Ic tends to increase with the passage of time of application of the input signal. If the collector current keeps increasing, the ignitor 1 could be burned out by excess current or abnormal heating. In order to prevent this, the collector current Ic must be limited to a predetermined current value.

The ignitor 1 of the present embodiment is provided with an IGBT 5*b* for sensing a minute sense current on the order of 1/100 to 1/10,000 of the main current (Ic: collector current). The sense current is converted into a voltage (sense voltage Vs) corresponding to the current value by a sense resistor 35. The sense voltage Vs is compared with a reference voltage Vref in an operational amplifier (comparator) 17. The comparator 17 controls the gate voltage of the MOSFET 34 for controlling the IGBT gate potential leading to output such that the sense voltage Vs approaches the reference voltage Vref. Thus, the main current of the ignitor 1 is limited by this function so as not to exceed a set current value.

Referring to FIG. 5, the period following time t4 shows the operation of the current limiting function in the event that a signal has been continuously applied to the input terminal 20. At time t5, if the signal exceeds the predetermined current limitation value, the collector current is controlled so as to achieve a certain current value. In this way, the collector current is limited in case of an unexpected event, such as engine stall, thereby preventing troubles, such as damage to the coil or circuitry.

In the present embodiment, the collector-voltage-limiting zener diode 7 is provided for protection purposes in case an excessive voltage is applied to the collector terminal (main current output terminal 21). If the ignition of fuel fails when the engine is running for some reason, the voltage on the primary side of the ignition coil 2 could become far higher than the predetermined voltage. If that happens, and if the voltage at the collector terminal 21 increases beyond the withstand voltage of IGBT 5, IGBT 5 could be destroyed. Therefore, IGBT 5 is protected by setting the breakdown voltage of the collector voltage-limiting zener diode 7 to be lower than the withstand voltage of IGBT 5. Namely, if an excessive voltage is applied to the collector terminal 21, the zener diode 7 would break down to increase the voltage at the gate terminal 23, whereby IGBT 5 would be turned on again, which would prevent the increase of the collector terminal voltage.

Furthermore, the present embodiment is provided with an input protection zener diode 30, and a turning-off diode 39 and resistor 38 for adjusting the rate at which IGBT 5 is turned on and off by changing the gate resistance thereof during on and off periods. A resistor 15 that functions at the time of turn-on has a relatively large resistance value for adjusting a limited current value, such as on the order of 1 to 10 kΩ, for example. On the other hand, the resistor 38 that functions at the time of turn-off has a smaller resistance than the resistor 15 for rate increasing purposes, such as on the order of 50 Ω to 1 kΩ.

The present embodiment further includes a function for automatically shutting itself down upon detection of an abnormality, such as overheating of the ignitor 1 due to excess current, or a continuous application of control signal from the ECU. In the event of self-shut down, which is different from the normal shutdown operation, surges in collector voltage must be controlled. This is due to the fact that the self-shutdown is not synchronized with ignition. If the collector voltage surges during self-shutdown, a high voltage would be generated on the secondary side of the ignition coil 2, which would lead to an erroneous ignition of the ignition plug 3. To prevent this, the self-shutdown must proceed gradually while collector voltage surges are controlled. In the present embodiment, the gate voltage of IGBT 5 can be decremented by driving MOSFET 33, which is provided for self-shutdown purposes, while supplying the output of the abnormality detection circuit 12 to the integration circuit 13. The time constant of the integration circuit 13 is designed to be 10 milliseconds or more.

Figure 6:
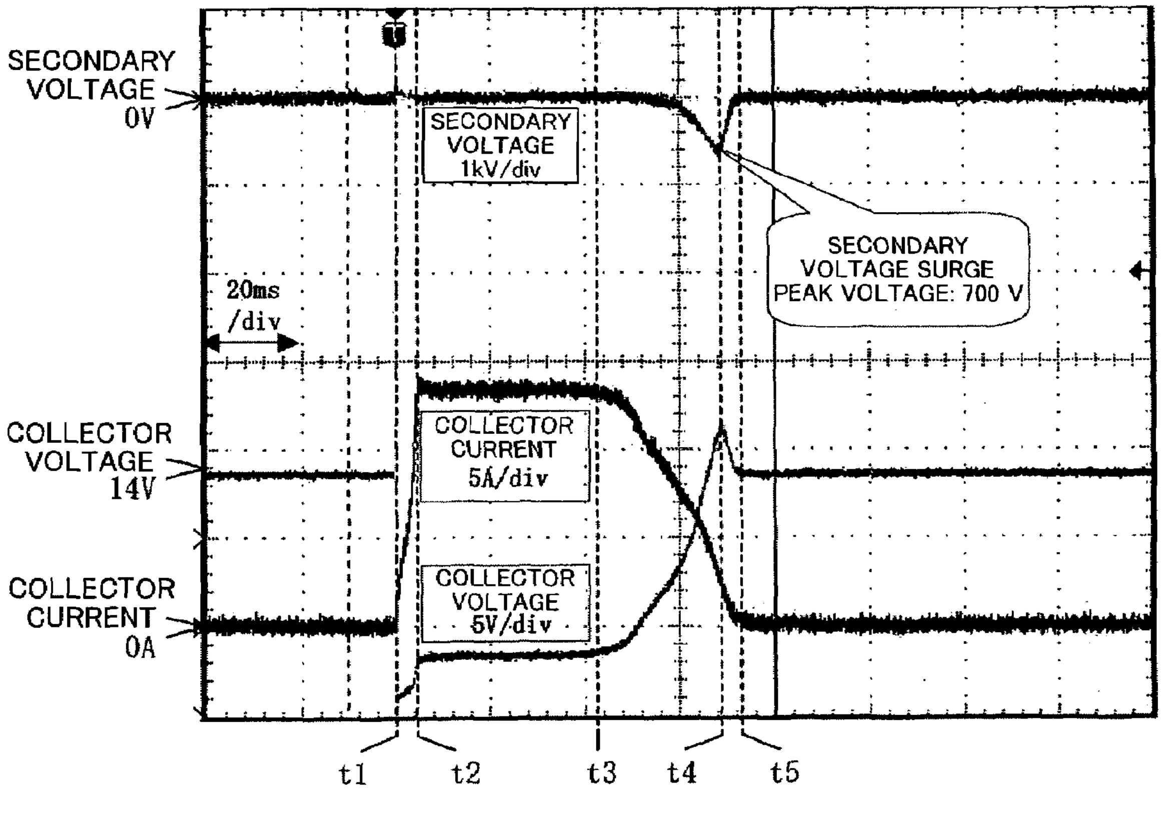
FIG. 6 shows a waveform chart illustrating a self-shutdown operation upon detection of an abnormality by the ignitor shown in FIG. 4.

FIG. 6 shows a waveform chart illustrating the self-shutdown operation of the ignitor 1 upon detection of an abnormality. With reference to this chart, the self-shutdown operation upon detection of an abnormality is described. The operation waveforms show the results of observing the collector voltage, collector current, and the voltage on the secondary side of the ignition coil 2 in a case where the ignition coil 2 was connected to the ignitor 1 and the shutdown operation was activated by increasing the ambient temperature to 150° C.

At time t1, the control signal at the input terminal 20 rises, resulting in the collector current Ic increasing in accordance with a slope (di/dt) that is determined by the inductance of the ignition coil 2 and voltage. After approximately 4 milliseconds, or at time t2, the current value reaches a current limitation value, whereupon the current limiting function is activated and the collector current is controlled so as to achieve a constant value.

At time t3, the abnormality detection circuit 12 detects an abnormality, and the collector current Ic is shut down gradually while controlling the surge in the collector voltage (at main-current output terminal 21). At time t4, the surge in the collector voltage 21 reaches its peak. The peak voltage on the secondary side of the ignition coil 2 is approximately 700 V, which is below the voltage at which an erroneous ignition of the ignition plug could be caused, or 1 kV. At time t5, the collector current is completely shut down.

Figure 7:
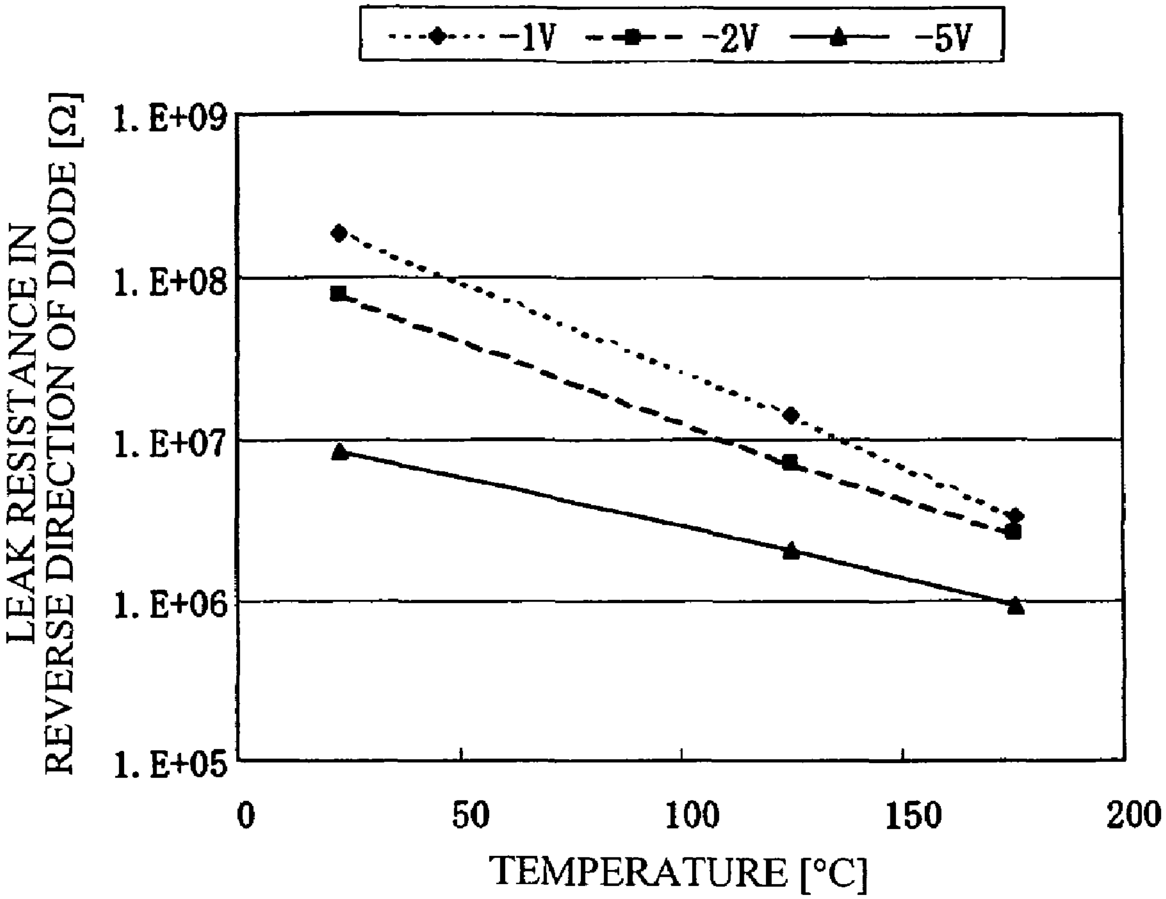
FIG. 7 shows a characteristics chart illustrating the temperature dependency of the reverse leak resistance of a diode in the integration circuit in the example of FIG. 4.

FIG. 7 shows the temperature dependency of the reverse leak resistance of the diode 8 in the integration circuit 13. The characteristics of the reverse leak resistance of the diode 8 are such that its resistance decreases at higher temperatures. The characteristics show that the shutdown operation can be made more effective upon self-shutdown caused by excessive temperature by utilizing the reverse leak resistance of the diode 8 in the integration circuit 13, the reverse leak resistance thus providing a fail-safe mechanism.

As described above, in the present embodiment, by gradually controlling the shutdown MOSFET 33 by the output of the integration circuit 13, the gate voltage of IGBT 5 can be decremented in a matter of milliseconds, so that the collector current can be shut down while controlling the surge in the collector voltage. In this way, a self-shutdown that does not lead to an erroneous ignition of the ignition plug 3 can be realized.

Furthermore, because the integration circuit 13 is composed of passive elements, the circuit size can be reduced as compared with an integration circuit composed of a digital circuit and an operational amplifier circuit. Thus, the chip area of the ignitor 1 can be reduced.

Furthermore, because the resistor element of the integration circuit 13 utilizes the reverse leak resistance of the diode

8, a time constant on the order of several tens of milliseconds can be realized with a smaller area.

Embodiment 5

Figure 8:
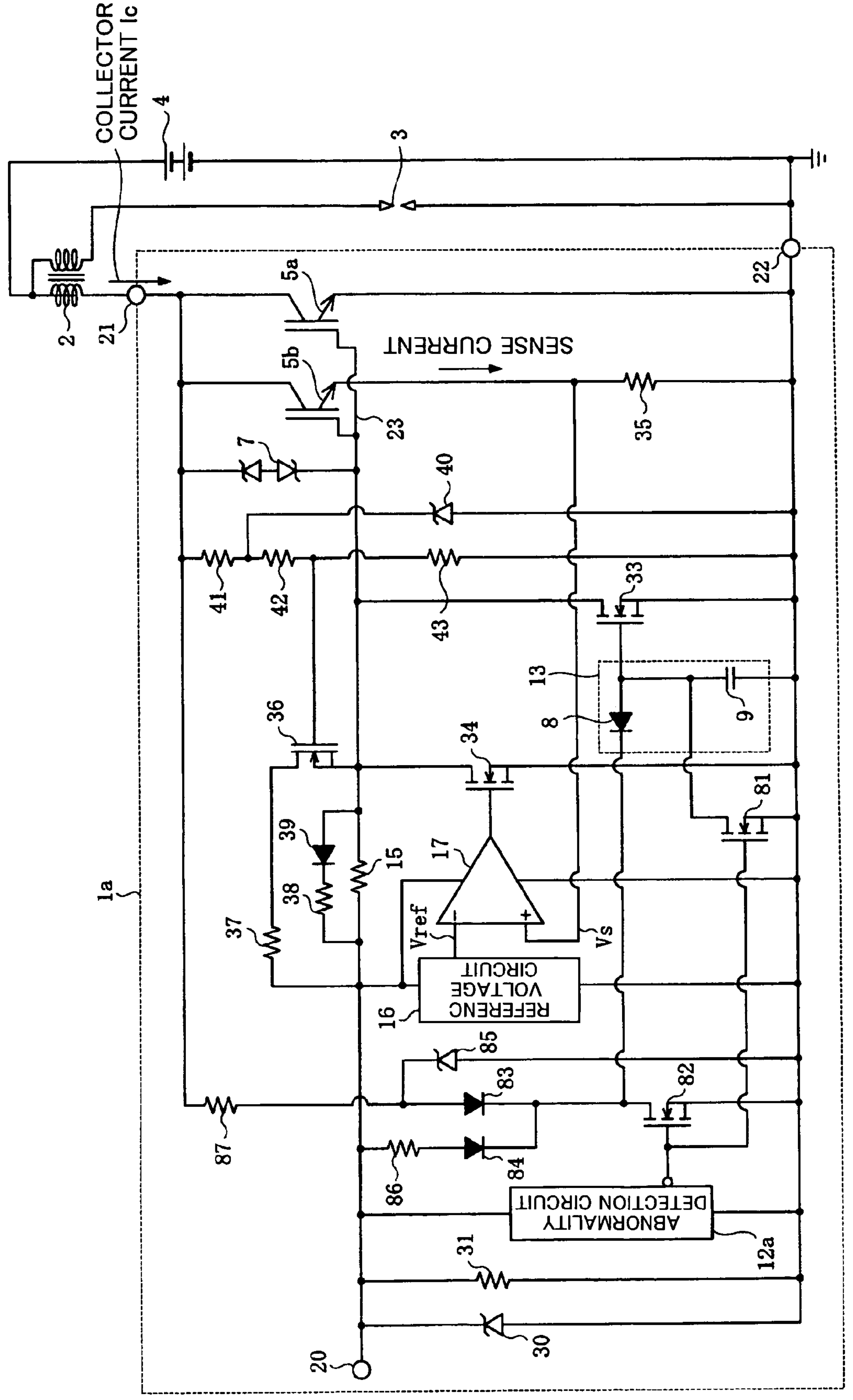
FIG. 8 shows a circuit diagram of the ignitor according to another embodiment of the invention.

FIG. 8 shows the circuit diagram of the ignitor according to another embodiment of the invention.

An ignitor 1*a* of the present embodiment differs from that of Embodiment 4 in the structure of the abnormality detection circuit 12 and the integration circuit 13.

An abnormality detection circuit 12*a* shown in FIG. 8 produces a fall signal upon detection of an abnormality, as opposed to the abnormality detection circuit 12 of FIG. 4. The output of the abnormality detection circuit 12*a* is connected to MOSFETs 81 and 82. MOSFETs 81 and 82 are on during normal operation, short-circuiting the input and output of the integration circuit 13 to the ground level. Upon detection of an abnormality, MOSFETs 81 and 82 are turned off, thereby connecting a path from the input terminal 20 via resistor 86 and diode 84, and another path from the main current output terminal (namely, the collector) 21 via resistor 87 and diode 83, to the integration circuit 13. As a result, a wired OR is formed, whereby the potential of the input to the integration circuit 13 is made higher.

Thus, in accordance with the present embodiment, the voltage applied to the integration circuit 13 can be increased by using the wired OR configuration, so that a sufficient potential for driving the self-shutdown MOSFET 33 in the subsequent stage can be ensured.

Embodiment 6

Figure 9:
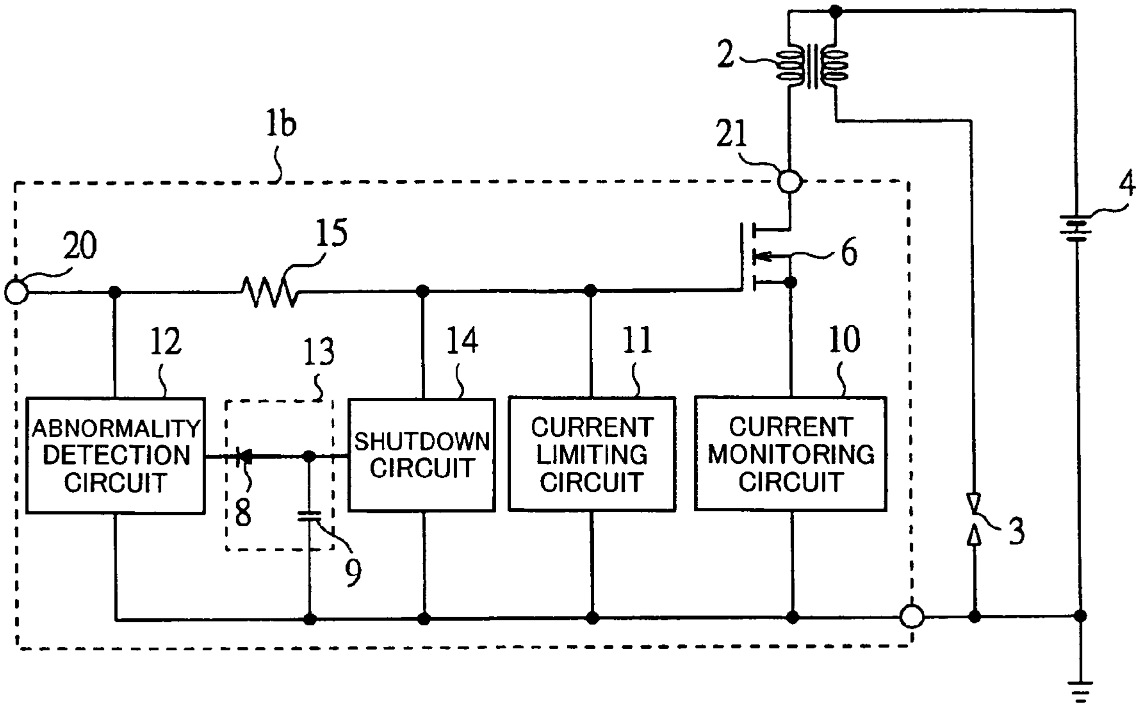
FIG. 9 shows a block diagram of the ignitor according to yet another embodiment of the invention.

FIG. 9 shows a block diagram of the ignitor according to another embodiment of the invention.

An ignitor 1*b* of the present embodiment differs from the ignitor of the foregoing embodiment in that it comprises a power MOSFET 6 as the main current switching device. The ignitor 1*b* is fed with a control signal at the input terminal 20 thereof from the ECU, which is not shown. The main current output terminal 21 of the ignitor 1*b*, which is the drain terminal of the power MOSFET 6, is connected to the primary side of the ignition coil 2. The secondary side of the ignition coil 2 is connected to the ignition plug 3. The common terminal to the primary and secondary sides of the ignition coil 2 is connected to the battery 4, which is the power supply.

The current in the ignitor 1*b* is controlled by the gate voltage of the power MOSFET 6. Between the source of the power MOSFET 6 and ground, there is provided a current monitoring circuit 10 that monitors the source current in the power MOSFET 6. The current limiting circuit 11 controls the gate voltage of the power MOSFET 6 such that a desired drain current can be obtained through the voltage dropped across the resistor 15, by adjusting the impedance between the gate of the power MOSFET 6 and ground depending on the output of the current monitoring circuit 10.

An abnormality detection circuit 12, upon detecting an abnormality, such as a delay in the fall edge of the control signal from the ECU, or overheating in the chip, triggers self-shutdown for preventing the thermal runaway or burning out of the ignitor 1*b*. The output of the abnormality detection circuit 12 is used to control a shutdown circuit 14 via integration circuit 13 comprised of a diode 8 and a capacitor 9, so that the gate voltage of the power MOSFET 6 can be lowered and its drain current can be shut down.

When the abnormality detection circuit 12 detects abnormality and self-shutdown is to be implemented, it is necessary to control the ignition plug 3 such that it does not produce an erroneous ignition. If the drain current of the power MOSFET 6 is shut down abruptly, the drain voltage (at main current output terminal 21) could rise up sharply, resulting in a high voltage produced at the secondary side of the ignition coil 2, which would lead to an erroneous ignition of the ignition plug 3. Therefore, it is necessary to decrement the gate voltage of the power MOSFET 6, such that the drain voltage 21 would not increase sharply. For this purpose, the shutdown circuit 14 is controlled through the integration circuit 13 to which the output of the abnormality detection circuit 12 is fed. In this way, the gate voltage of the power MOSFET 6 can be decremented when shutting down the drain current.

Thus, in accordance with the present embodiment, upon detection of abnormality by the abnormality detection circuit 12, the gate voltage of the power MOSFET 6 is gradually controlled so that the drain current can be gradually shut down. Thus, the self-shutdown can be performed without an erroneous ignition of the ignition plug 3.

Embodiment 7

Figure 10:
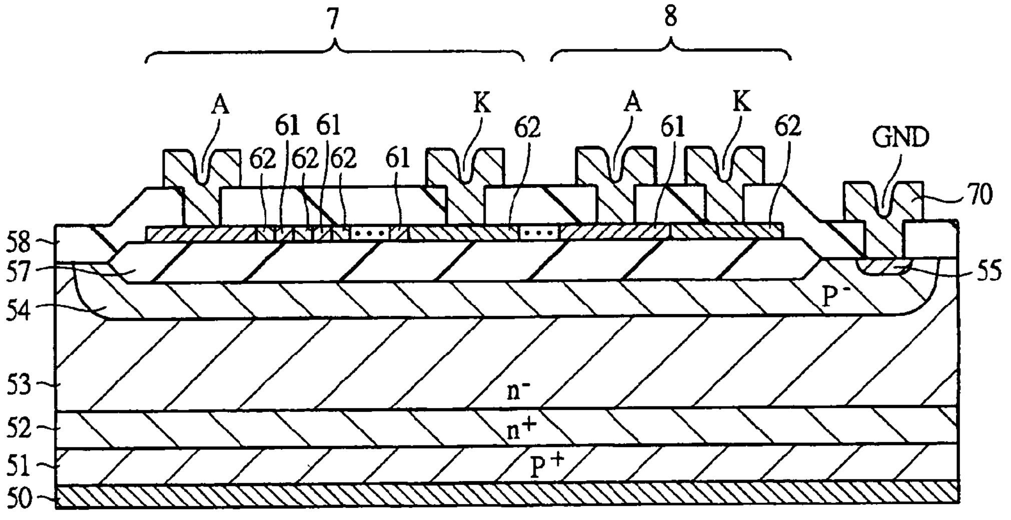
FIG. 10 shows a cross-sectional view of an example of a diode used in the integration circuit of the ignitor according to an embodiment of the invention.

FIG. 10 shows a cross-sectional view showing an example of the diode used in the integration circuit of an ignitor in accordance with another embodiment. The cross-sectional view is that of an example in which an IGBT is used as a switching device.

The figure shows a semiconductor substrate comprising, at the bottom thereof, a collector electrode 50; a p-type collector layer 51 with a high impurity concentration; a n-type buffer layer 52 also with a high impurity concentration; and a n-type drift layer 53 with a low impurity concentration. On the surface of the semiconductor substrate where a diode 8 is formed, a p-type diffusion layer 54 with low impurity concentration is provided which is connected to GND potential via a p-type diffusion layer 55 with high impurity concentration and an electrode 70. The diode 8 is formed by forming a polysilicon pattern on a field oxide film 57 and then providing a p-type polysilicon 61 and an n-type polysilicon 62 by ion implantation, for example. Numeral 7 designates a clump diode between the collector and gate of IGBT 5. The diode 8 is used in the integration circuit 13.

In the present embodiment, because the diode 8 used in the integration circuit 13 can be formed simultaneously with the formation of the clump diode 7 between the collector and gate of IGBT 5, no additional process is required. Furthermore, in order to increase the resistance value of the leak resistance in the diode 8 for the integration circuit, p- and n-types are formed in multiple stages, as in the clump diode 7, so that diodes in multiple stages can be formed without an increase in area.

Figure 11:
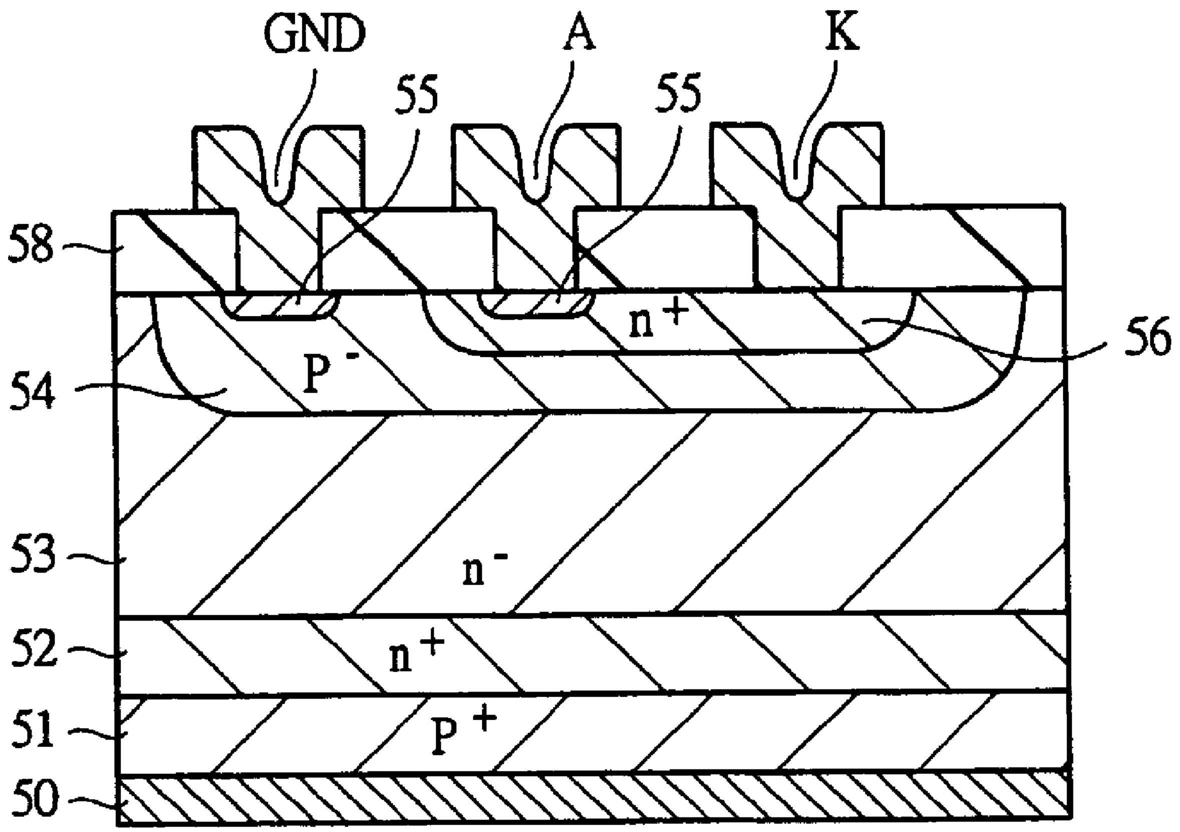
FIG. 11 shows a cross-sectional view of an example in which the diode used in the integration circuit of the ignitor in an embodiment of the invention is formed within a semiconductor substrate.

FIG. 11 shows a cross-sectional view of the diode 8 for the integration circuit being formed within the semiconductor substrate. Numerals similar to those shown in FIG. 10 are not shown for the sake of simplicity. An n-type diffusion layer 56 for a cathode is formed in a p-type diffusion layer 54 with a low impurity concentration that is connected to GND potential. Further within the n-type diffusion layer 56, there is formed a p-type diffusion layer 55 with a high impurity concentration for an anode.

Figure 12:
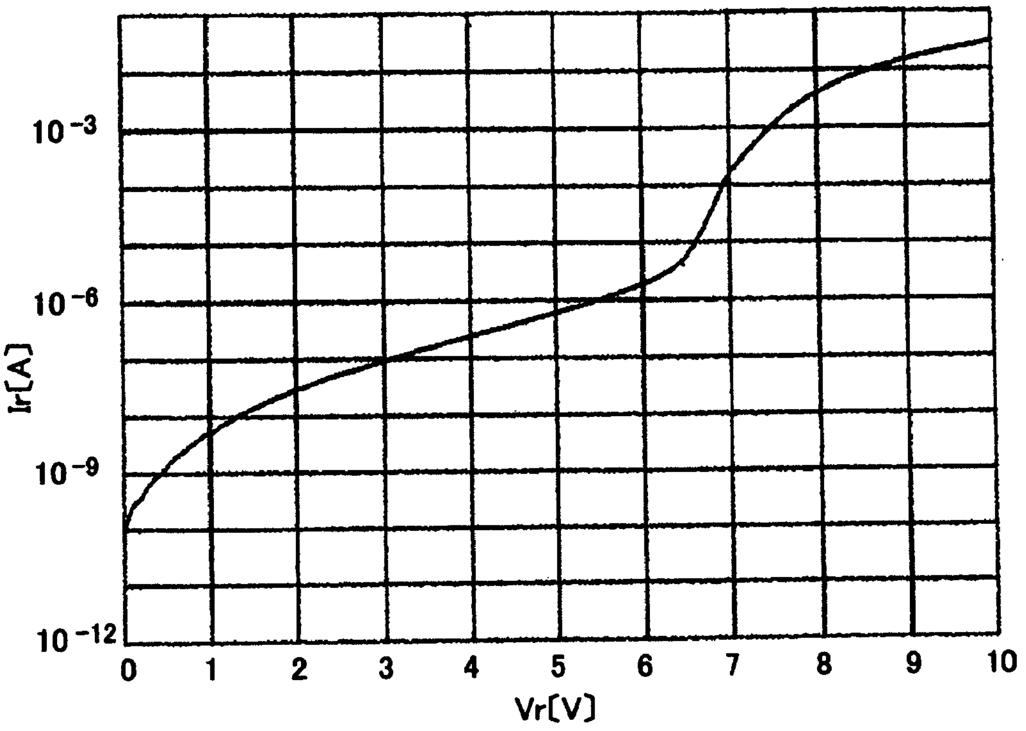
FIG. 12 shows a characteristics chart illustrating the relationship between the reverse voltage and current in the diode shown in FIG. 10 in an embodiment of the invention.

FIG. 12 shows a characteristics chart illustrating the relationship between the reverse voltage and current in the diode 8 formed with polysilicon.

The reverse leakage current of the diode 8 is Vr/Ir, which means it has a voltage dependency. The resistance characteristics are nonlinear. The output of the integration circuit 13 comprised of the nonlinear resistor and capacitor 9 has increasing time constant with the decrease in the voltage applied to the diode 8 in the reverse direction. Thus, the integration circuit 13 raises the gate voltage of n-type MOSFET for shutdown purposes in the subsequent stage quickly up to around the threshold voltage and then increments the gate voltage to near the threshold voltage. In this way, the impedance of the MOSFET 33 for shutdown purposes can be gradually controlled.

Embodiment 8

Figure 13:
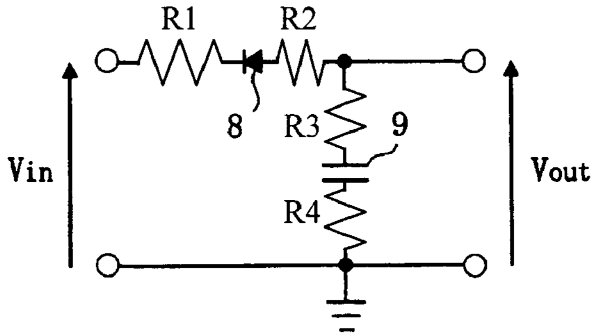
FIG. 13 shows a circuit diagram of an example of another integration circuit according to another embodiment of the invention.

FIG. 13 shows the configuration of an integration circuit according to another embodiment of the invention. The present embodiment is similar to those of Embodiments 1 to 7 except for the fact that the integration circuit of Embodiment 1 shown in FIG. 1 is replaced with the integration circuit shown in FIG. 13.

In the integration circuit of the present embodiment, resistors R1, R2, R3, and R4 with smaller resistance values than the reverse leak resistance of the diode 8 are connected across the diode 8 and across the capacitor 9, as shown in FIG. 13. The resistors R1, R2, R3, and R4 may be either provided by the resistance of the leads of the diode 8 or the capacitor 9, resistance relating to the connection of the diode 8 or the capacitor 9, individual resistors, or resistor elements formed on a semiconductor substrate.

In the present embodiment too, an integration circuit of 1 to 10 milliseconds order can be fabricated on a semiconductor substrate, so that the size or area of circuitry on the semiconductor substrate can be reduced as compared with the case of using a digital circuit.

While the invention has been particularly shown and described with reference to preferred embodiments thereof, it will be understood by those skilled in the art that the foregoing and other changes in form and details can be made thereto without departing from the spirit and scope of the invention.

The integration circuit and decrement circuit according to the invention can be effectively applied to the ignitor on automotive engines. They can also be widely applied to other devices that require time constants on the millisecond order or shorter.

What is claimed is:

1. An integration circuit comprising a diode and a capacitor, wherein said diode and said capacitor are connected in series between an input terminal and ground, wherein a cathode terminal of said diode is used as said input terminal and an anode terminal of said diode is connected to one end of said capacitor and used as an output terminal, the other end of said capacitor being connected to ground.

2. The integration circuit according to claim 1, wherein said diode comprises diodes in multiple stages.

3. The integration circuit according to claim 1, wherein said diode comprises a diode-connected MOSFET.

4. The integration circuit according to claim 1, wherein said diode comprises a diode-connected bipolar transistor.

5. A decrement circuit comprising the integration circuit according to claim 1, further comprising a resistor and a MOSFET, wherein said resistor and said MOSFET are connected in series between a power supply terminal and ground, wherein a connection point between said resistor and said MOSFET is used as an output terminal, and wherein the output of said integration circuit is connected to the gate of said MOSFET.

6. An integration circuit comprising a diode and a capacitor, wherein said diode and said capacitor are disposed between an input terminal and ground, wherein one end of said diode is connected to said input terminal via a first resistor element, the other end of said diode is connected to one end of a second resistor element, one end of said capacitor is connected to one end of a third resistor element, the other end of said second resistor element and the other end of said third resistor element are connected to an output terminal, and the other end of said capacitor is connected to ground via a fourth resistor element, and wherein the resistance values of said first through said fourth resistor elements are smaller than the reverse leakage resistance of said diode.

7. The integration circuit according to claim 6, wherein one or more of said first resistor element, said second resistor element, said third resistor element, and said fourth resistor element are provided by the resistance of their leads or other resistance relating to connection.

8. An integration circuit comprising a diode and a capacitor, wherein said diode and said capacitor are connected in series between an input terminal and ground, wherein one end of said diode is used as said input terminal and the other end of said diode is connected to one end of said capacitor and used as an output terminal, the other end of said capacitor being connected to ground, and wherein said diode comprises diodes in multiple stages.

9. A decrement circuit comprising an integration circuit, a resistor, and a MOSFET, wherein the integration circuit comprises a diode and a capacitor, said diode and said capacitor being connected in series between an input terminal and ground, one end of said diode being used as said input terminal and the other end of said diode being connected to one end of said capacitor and used as an output terminal, and the other end of said capacitor being connected to ground, wherein said resistor and said MOSFET are connected in series between a power supply terminal and ground, wherein a connection point between said resistor and said MOSFET is used as an output terminal, and wherein the output of said integration circuit is connected to the gate of said MOSFET.

* * * * *